United States Patent [19]
Potts et al.

[11] Patent Number: 5,539,045
[45] Date of Patent: Jul. 23, 1996

[54] ALIPHATIC SILYLATED POLYURETHANE MIXTURES HAVING REDUCED VISCOSITES

[75] Inventors: Keith B. Potts, Elgin; Kanu R. Chokshi, Crystal Lake, both of Ill.

[73] Assignee: Morton International, Inc., Chicago, Ill.

[21] Appl. No.: 550,122

[22] Filed: Oct. 27, 1995

[51] Int. Cl.$^6$ ................ C08J 3/00; C08K 3/20; C08L 83/00; C08G 77/04
[52] U.S. Cl. ................ 524/588; 528/28; 528/49
[58] Field of Search ............ 528/28, 49; 524/588

[56] References Cited

U.S. PATENT DOCUMENTS

| | | | |
|---|---|---|---|
| 3,632,557 | 1/1972 | Brode et al. | 260/77.5 TB |
| 3,941,753 | 3/1976 | Brinkman et al. | 260/77.5 MA |
| 4,798,878 | 1/1989 | Brinkman et al. | 528/28 |
| 4,954,598 | 9/1990 | Baghdachi et al. | 528/28 |

OTHER PUBLICATIONS

Landon, et al., *Advances In Adhesives & Sealants Tech.*, Paper 13, "Silylated Polyurethane Polymers For Sealants," 14 pages, Sept. 20–21, 1994.

*Primary Examiner*—Paul R. Michl
*Assistant Examiner*—Patrick Niland
*Attorney, Agent, or Firm*—Robert M. Didrick; Gerald K. White

[57] ABSTRACT

A silylated polyurethane made by the reaction of an isocyanate-terminated polyurethane a mixture of a first and a second alkoxysilane, each of which has the general formula:

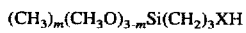

$(CH_3)_m(CH_3O)_{3-m}Si(CH_2)_3XH$ wherein X is NR, S, oxygen, or a ureido radical, and R is hydrogen, alkyl, aryl, aminoalkyl or trimethoxysilylpropyl, has a lower viscosity than the average of the viscosities of two polyurethanes made from the same isocyanate-terminated polyurethane and either the first alkoxysilane or the second alkoxysilane. Likewise, a blend of those two silylated polyurethanes has a lower viscosity than the viscosity anticipated by the linear viscosity relationship typically observed for blends. Said linear relationship is based on a calculation of the weighted average viscosity of the blend from the viscosity of each component and the proportion of each.

11 Claims, 1 Drawing Sheet

ALIPHATIC SILYLATED POLYURETHANE MIXTURES HAVING REDUCED VISCOSITES

BACKGROUND OF THE INVENTION

This invention is related to alkoxysilane terminated moisture-hardening polyurethanes, to a method for reducing their viscosity without solvents or plasticizers, and to the use of said reduced-viscosity mixtures in adhesive and sealing compounds.

The use of silylated polyurethanes in construction adhesive and joint sealant compounds provides faster cure times, greater durability and improved adhesion, elongation, tensile strength, and elasticity in comparison with the compounds that they replace. It is not uncommon, however, to encounter viscosities of a million centipoises when formulating such compounds with silylated polyurethanes. A desirable viscosity is on the order of about 20,000 centipoises. Solvents and plasticizers have thus become a necessary part of the formulator's art when processing and application problems are caused by such high viscosities.

SUMMARY OF THE INVENTION

It is an object of this invention, therefore, to provide a low viscosity silylated polyurethane which allows the formulation of sealants and adhesives which are substantially free of solvents and have lower plasticizer requirements for the maintenance of a viscosity within a convenient processing and working range.

It is another object of this invention to provide silylated polyurethane mixtures having viscosities which allow the formulation of environmentally friendly sealants and adhesives which are substantially free of solvents and have lower plasticizer level requirements.

It is a related object of this invention to provide a mixture of silylated polyurethanes whose viscosity is less than the weighted average of the viscosities of the silylated polyurethanes comprising the mixture.

It is a related object of this invention to provide a silylated polyurethane having a first alkoxy silane end cap and a second alkoxy silane end cap the viscosity of which is less than the weighted average of the viscosities of two silylated polyurethanes in which both end caps are either the first silane end cap or the second silane end cap.

These and other objects which will become apparent from the following description of the invention and the drawing are achieved by a silylated polyurethane mixture having a viscosity less than the weighted average of the viscosities of the constituent silylated polyurethanes, each constituent polyurethane having the general formula:

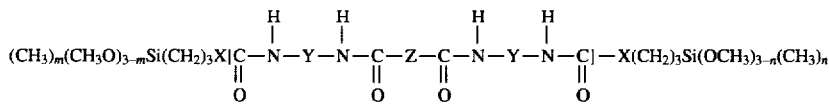

wherein m and n are independently zero or one, X is NR, S, oxygen, or a ureido radical, R is hydrogen, alkyl, aryl, aminoalkyl or trimethoxysilylpropyl, Y is a urethane residue, and Z is a polyol residue, with the proviso that at least one of m, n, X, or R in a first silylated polyurethane is different than it is in a second silylated polyurethane.

A more specific formula for a constituent polyurethane having a first alkoxy silane end cap and a second, different alkoxy silane end cap at opposite ends of the polymeric chain is:

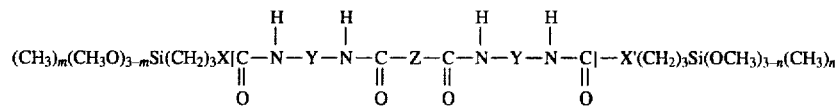

wherein m and n are independently zero or one, X and X' are independently NR, S, oxygen, or a ureido radical, R is hydrogen, alkyl, aryl, aminoalkyl or trimethoxysilylpropyl, Y is a urethane residue, and Z is a polyol residue, with the proviso that if m=n, X≠X', and if X=X', m≠n.

DETAILED DESCRIPTION OF THE INVENTION

Figure 1:
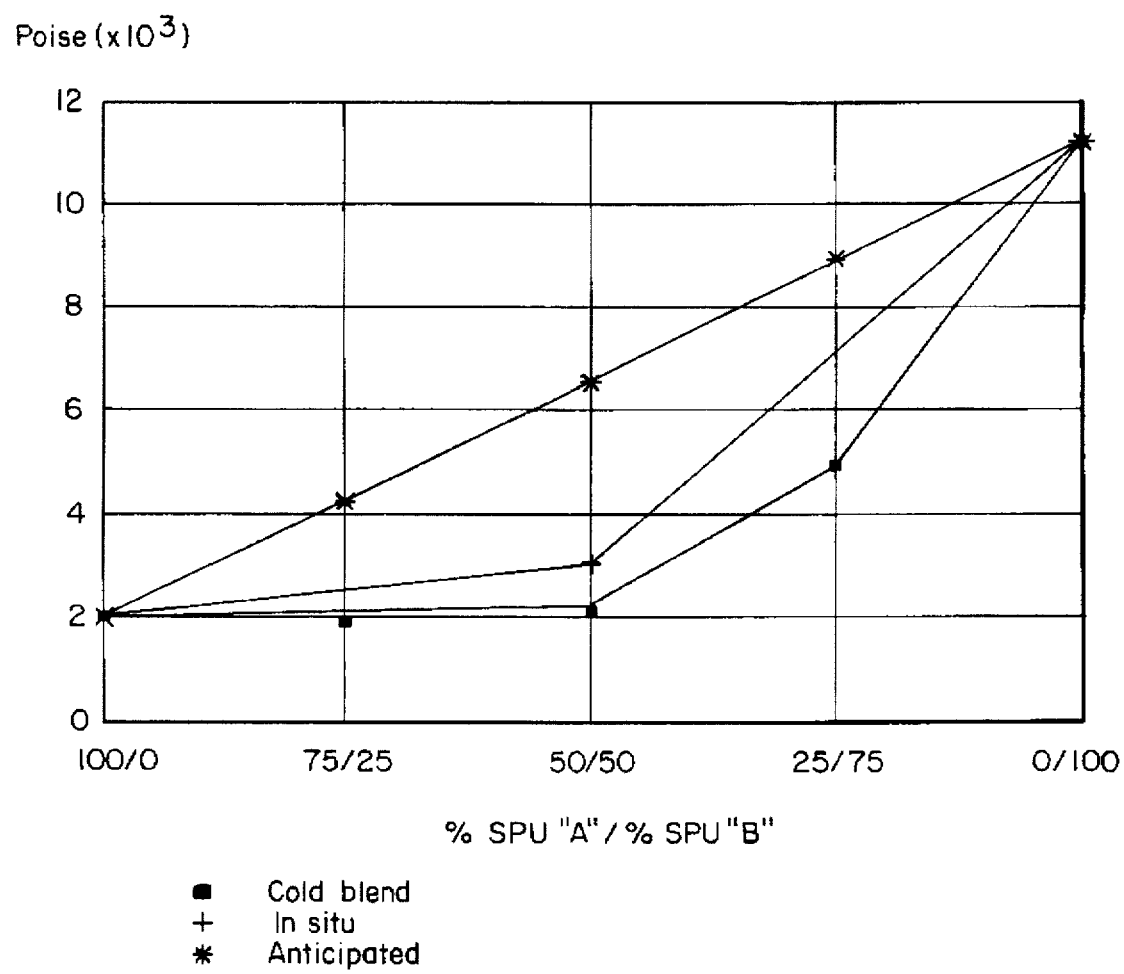
FIG. 1 is a linear graph illustrating the anticipated viscosities of mixtures of silylated polyurethanes "A" and "B", and the actual viscosities of cold blends of said silylated polyurethanes and of mixed end-cap silylated polyurethanes made in situ from a mixture of silanes "A" and "B". As the graph shows, the actual viscosities of the 50:50 mixtures are less than half of the anticipated values.

In the foregoing general formula, for R, the alkyl group has from 1 to 3 carbon atoms, the aryl group has from 6 to 10 carbon atoms, and the aminoalkyl group has from 2 to 3 carbon atoms. The alkyl group may be methyl, ethyl, or propyl. The aryl group preferably is phenyl but naphthyl is suitable. The aminoalkyl group may be aminoethyl or aminopropyl.

The urethane residues represented by Y are formed by the reaction of an isocyanate terminated polyether polyurethane with one or more silanes having the formula:

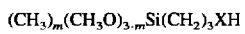     Formula A wherein X has the aforesaid meaning. The polyether polyurethane is a product of the reaction of a polyol with an excess of an isocyanate having a weight average molecular weight of from about 1000 to 30,000, preferably from about 2000 to about 25,000 (the weight average being calculated from the isocyanate content of the polymer). The polyol and polyisocyanate reactants are as taught in U.S. Pat. No. 4,798,878 and the reaction procedure is taught in U.S. Pat. No. 3,941,753, both of which patents are hereby incorporated herein by reference for such teaching. The procedure for the reaction of the isocyanate terminated polyether polyurethane with the silanes is taught in U.S. Pat. No.

3,632,57, which is also incorporated herein by reference for such teaching.

Examples of the silanes which are suitable for the purposes of this invention include phenylaminopropyltrimethoxysilane and 3-aminopropyltrimethoxysilane, which are silanes "A" and "B" used in the preparation of the SPU "A" and SPU "B" of FIG. 1. Silanes "A" and "B" are sold under the trademark and numbers SILQUEST Y-9669 and SILQUEST A-1110, respectively, by OSi Specialties, Inc. Other examples of suitable silanes represented by Formula A include the following SILQUEST products:

bis-(3,3-trimethoxysilyl)propylamine (A-1170);
3-aminopropylmethyldimethoxysilane (Y-11159);
3-mercaptopropyltrimethoxysilane (A-189);
3-ureidopropyltrimethoxysilane (Y11542);
arylaminopropylmethyldimethoxysilane (Y-1663);
3-aminopropyltriethoxysilane (A-1100); and
N-(2-aminoethyl)-3-aminopropyltrimethoxysilane (A-1120).

The following suitable silanes are available under the trademark HÜLS:

methyl-3-aminopropyltrimethoxy silane (1110), and
N-(2-aminoethyl)-3-aminopropylmethyldimethoxysilane (1411).

Coating, sealing, and adhesive compositions may be produced from the low viscosity polyurethane mixtures of this invention in fully conventional fashion. Backbedding formulations for glazing windows in their frames are of particular interest in the practice of this invention. Conventional fillers, pigments and other coloring agents, antioxidants, adhesion promoters, and extenders may be employed in the formulation of such compositions. Preferred fillers are sand, rock flour, calcium carbonate, and silicic acids.

Plasticizers and solvents, although not needed at all in many compositions of this invention, may be used in amounts much less than has been necessary in the past. Some of the silylated polyurethanes of this invention are free or substantially free of solvents and/or plasticizers. The maximum amount of solvent is about 2% by weight of the total sealant weight.

Small amounts of catalysts such as dibutyltin diacetate and tetrabutyl dioleatostannoxane may be used to accelerate curing of the compositions of this invention.

It is believed that one skilled in the polyurethane art may utilize the invention as thus disclosed and hereinafter claimed.

The following examples of specific embodiments of the invention are merely illustrative and not limitative of the invention in any way; all parts and percentages are by weight.

EXAMPLE 1

A mixture of 1125 parts (0.29 mole) of a polyetherpolyol having functionality of 1.93, a hydroxyl number of 27.7, and a molecular weight of 3821 (ARCOL E-2204) and 74.2 parts (0.44 mole) of hexanediisocyanate (DESMODUR H), 0.1 part of THERMOLITE 12 catalyst, and 0.02 part of benzoyl chloride was held at 70°–80° C. for about 3 hours to reduce its NCO content to 0.95 per cent. Then, 72.6 parts of phenylaminopropyltrimethoxysilane (Silane "A") was added and the mixture was held at 72° C. until the NCO content was zero. The product is SPU "A". Its Brookfield viscosity was 184,000 cps with a #7 spindle at 2.5 rpm.

EXAMPLE 2

The general procedure of Example 1 was followed with the exceptions that 1201.5 parts of the polyetherpolyol, 79.4 parts of the hexanediisocyanate, and 0.15 part of the THERMOLITE 12 catalyst, were used, and 47.7 parts of 3-aminopropyltrimethoxysilane (Silane "B") replaced the Silane "A". Its Brookfield viscosity was 1,144,000 cps with a #7 spindle at 2.5 rpm.

EXAMPLE 3

Three blends of SPU "A" and SPU "B" were made at 25/75, 50/50, and 75/25 weight per cent of each. The Brookfield viscosities of the blends are given in FIG. 1. The anticipated viscosities of each blend (the weighted average of the viscosities of each SPU in the blend) are also given.

EXAMPLE 4

The general procedure of Example 1 was followed except that a 50:50 by weight mixture of Silane "A" and Silane "B" replaced the Silane "A". The Brookfield viscosity of the resulting SPU was 204,000 cps with a #7 spindle at 2.5 rpm instead of the anticipated 670,000 as shown in FIG. 1.

EXAMPLE 5

An SPU prepared by the general procedure of Example 4 was mixed with an amount of diisodecyl phthalate equal to 15% of the weight of the SPU. This plasticized SPU is called SPU-P. A backbedding sealant was made up according to the following formulation in a high speed ROSS mixer under vacuum. It was tested for tensile strength, elongation, modulus of elasticity, slump resistance, hardness, and tear strength according to conventional testing procedures. The test results are given in Table 1.

| COMPONENT | AMOUNT %$_w$ |
| --- | --- |
| SPU-P | 36.43 |
| BENZOFLEX 400 plasticizer | 12.16 |
| TiO$_2$ | 4.9 |
| Calcium carbonate (HAKUNENKA) | 23.46 |
| Fumed silica (CABOT TS-720) | 2.6 |
| Calcium carbonate (DURAMITE) | 23.80 |
| Adhesion promoter (Silane A-1120) | 0.37 |
| Adhesion promoter (Silane A-171) | 1.18 |
| Dibutyltin dilaurate | 0.13 |
| MEK | 0.98 |

TABLE 1

| | |
| --- | --- |
| Tensile Strength | 266 psi |
| Elongation | 208% |
| Modulus of Elasticity 5% | 19.2 |
| Modulus of Elasticity 10% | 37.6 |
| Modulus of Elasticity 25% | 77.3 |
| Modulus of Elasticity 50% | 152 |
| Modulus of Elasticity 100% | 216 |
| Modulus of Elasticity 200% | 279 |
| Hardness | 45A |
| Tear Strength | 41.3 pli |
| Modified slump | 0.10 inch |
| Viscosity* | 2,260,000 cps |

*A T-F spindle was used instead of the T-E spindle.

The sealant of Example 5 was sandwiched between two panels of glass and the force required to pull them apart was measured as 117 psi. The elongation during said pulling was 64%. The modulus of elasticity was as follows:

| 5% | 10% | 20% | 40% | 60% |
| --- | --- | --- | --- | --- |
| 10.9 | 21.4 | 45.2 | 89.5 | 115 |

The preceding examples can be repeated with similar success by substituting the specifically described silanes of Formula A, the polyether polyols, and the polyisocyanates generically described hereinabove for those used in said examples.

From the foregoing description, one skilled in the art may easily learn the essential characteristics of this invention and may make various changes and modifications of it without departing from the scope of the invention.

The subject matter claimed is:

1. A silylated polyurethane mixture having a viscosity less than the weighted average of the viscosities of the constituent silylated-polyurethanes, each constituent polyurethane having the general formula:

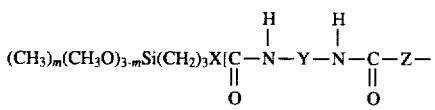

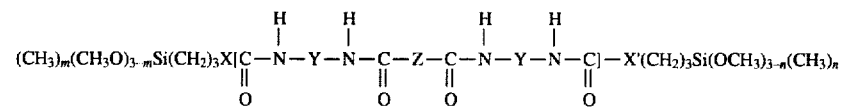

-continued

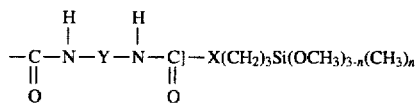

wherein m and n are independently zero or one, X is NR, S, oxygen, or a ureido radical, R is hydrogen, alkyl, aryl, aminoalkyl or trimethoxysilylpropyl, Y is a urethane residue, and Z is a polyol residue, with the proviso that at least one of m, n, X, or R in a first silylated polyurethane is different than it is in a second silylated polyurethane.

2. The mixture of claim 1 wherein a first polyurethane contains a silyl group A and a second polyurethane contains a silyl group B wherein A and B are either the $(CH_3)_m(CH_3O)_{3-m}Si(CH_3)_3X$-radical or the $-X(CH_2)_3Si(OCH_3)_{3-n}(CH_3)_n$ radical.

3. The mixture of claim 1 wherein m and n are zero and X is NR in each of the constituent polyurethanes, and R in one of the constituents is phenyl but is hydrogen in another of the constituent polyurethanes.

4. The mixture of claim 2 wherein m and n are zero and X is NR in each of the constituent polyurethanes, and R is phenyl in silyl group A and hydrogen in silyl group B.

5. A polyurethane having the general formula:

wherein m and n are independently zero or one, X and X' are independently NR, S, oxygen, or a ureido radical, R is hydrogen, alkyl, aryl, aminoalkyl or trimethoxysilylpropyl, Y is a urethane residue, and Z is a polyol residue, with the proviso that if m=n, X≠X' and if X=X' m≠n.

6. The polyurethane of claim 5 wherein X is NR and R is phenyl- and X' is NR and R is hydrogen.

7. A mixture of polyurethanes including the polyurethane of claim 5.

8. A mixture of polyurethanes including the polyurethane of claim 6.

9. A sealant composition comprising the polyurethane mixture of claim 1, a filler, and a curing catalyst.

10. A sealant composition comprising the polyurethane of claim 5, a filler, and a curing catalyst.

11. The sealant of claim 10 wherein X is NR and R is phenyl- and X' is NR and R is hydrogen.

* * * * *

UNITED STATES PATENT AND TRADEMARK OFFICE
CERTIFICATE OF CORRECTION

PATENT NO. : 5,539,045
DATED : July 23, 1996
INVENTOR(S) : Potts et al.

It is certified that error appears in the above-indentified patent and that said Letters Patent is hereby corrected as shown below:

On the title page, item [54] and column 1, line 2, "VISCOSITES" should read --VISCOSITIES--.

Col. 5, Ln. 45, "Si(CH$_3$)$_3$" should read -- Si(CH$_2$)$_3$ --.

Signed and Sealed this

Thirtieth Day of September, 1997

Attest:

BRUCE LEHMAN

Attesting Officer

Commissioner of Patents and Trademarks